(12) United States Patent
Amend et al.

(10) Patent No.: US 11,844,129 B2
(45) Date of Patent: Dec. 12, 2023

(54) ACCESS TO A HOME NETWORK WITHIN A MULTI-CONNECTIVITY FRAMEWORK

(71) Applicant: Deutsche Telekom AG, Bonn (DE)

(72) Inventors: Markus Amend, Nidda (DE); Eckard Bogenfeld, Carlsberg (DE); Thomas Henze, Bonn (DE); Katja Hellebrand, Bad Vilbel (DE)

(73) Assignee: DEUTSCHE TELEKOM AG, Bonn (DE)

( * ) Notice: Subject to any disclaimer, the term of this patent is extended or adjusted under 35 U.S.C. 154(b) by 2 days.

(21) Appl. No.: 17/335,105

(22) Filed: Jun. 1, 2021

(65) Prior Publication Data

US 2021/0385894 A1   Dec. 9, 2021

(30) Foreign Application Priority Data

Jun. 3, 2020 (EP) .................................. 20178017

(51) Int. Cl.
| | |
|---|---|
| *H04W 76/16* | (2018.01) |
| *H04W 76/12* | (2018.01) |
| *H04W 8/04* | (2009.01) |
| *H04W 8/28* | (2009.01) |

(52) U.S. Cl.
CPC ............. *H04W 76/16* (2018.02); *H04W 8/04* (2013.01); *H04W 8/28* (2013.01); *H04W 76/12* (2018.02)

(58) Field of Classification Search
CPC ....... H04W 76/16; H04W 76/12; H04W 8/04; H04W 8/28

USPC ................ 370/329, 228, 338, 341, 345, 350
See application file for complete search history.

(56) References Cited

U.S. PATENT DOCUMENTS

| | | | | |
|---|---|---|---|---|
| 2003/0140145 A1* | 7/2003 | Lindberg | ................ | H04M 3/42 709/227 |
| 2005/0066041 A1* | 3/2005 | Chin | ....................... | H04L 61/30 709/228 |
| 2012/0163180 A1* | 6/2012 | Goel | ..................... | H04L 45/306 370/238 |
| 2014/0194118 A1* | 7/2014 | Liu | ....................... | H04W 36/18 455/435.1 |
| 2014/0200046 A1* | 7/2014 | Sikri | ..................... | H04B 17/345 455/552.1 |
| 2015/0264738 A1* | 9/2015 | Lee | ........................ | H04W 76/19 370/228 |
| 2020/0267076 A1 | 8/2020 | Batardière | | |

FOREIGN PATENT DOCUMENTS

| | | | |
|---|---|---|---|
| FR | 3072529 | A1 | 4/2019 |
| WO | WO 03017582 | A1 | 2/2003 |
| WO | WO 2015042189 | A1 | 3/2015 |

* cited by examiner

*Primary Examiner* — Nghi H Ly
(74) *Attorney, Agent, or Firm* — LEYDIG, VOIT & MAYER, LTD.

(57) ABSTRACT

A system includes: a user equipment (UE); at least two Internet access providers; a multi-connectivity provider backend; a home network (HN); and a data network (DN). The UE comprises at least two access interfaces. Multi-connectivity is provided between the UE and the HN. The multi-connectivity provider backend is configured to establish a connection to the HN, and to provide the UE with access to the HN.

19 Claims, 3 Drawing Sheets

ACCESS TO A HOME NETWORK WITHIN A MULTI-CONNECTIVITY FRAMEWORK

CROSS-REFERENCE TO PRIOR APPLICATIONS

Priority is claimed to European Patent Application No. EP 20178017.8, filed on Jun. 3, 2020, the entire disclosure of which is hereby incorporated by reference herein.

FIELD

The invention relates to a system configured to provide multi-connectivity between a User Equipment (UE) and a multi-connectivity provider backend and to provide access to a home network within a multi-connectivity framework and a method thereon.

BACKGROUND

Typically, Internet network operators provide one or several Internet accesses to customers such as, for example, fixed (e.g. xDSL), Wi-Fi (e.g. public hotspots) and/or cellular (e.g. 2G-5G) access.

Even if these customers own user equipment(s) (UE(s)), such as smartphones or residential gateways (RG), which are potentially capable of connecting to multiple accesses simultaneously, they do not make use of the capability to connect to multiple accesses simultaneously due to the lack of multi-connectivity technologies.

In the case of smartphones, the common simultaneous connectivity to Wi-Fi and cellular network does not automatically mean that the smartphones can enjoy the benefit of being simultaneously connected to more than one network. In some cases, applications of these smartphones are stuck to one access and are unable to benefit from a second available access in terms of reliability and speed.

Network protocols which could leverage the potential of multiple accesses like Multipath Transmission Protocol (MPTCP), Multipath Quick UDP Internet Connection (MP-QUIC), Multipath Datagram Congestion Control Protocol (MPDCCP) and Stream Control Transmission Protocol (SCTP) are not widely adopted and require usually an end-to-end implementation. A broad and fast availability is therefore unrealistic.

Standardized multi-connectivity architectures such as Access Traffic Steering Switching Splitting (ATSSS) part of 3GPP Rel. 16 standardization TS 23.501 version 16.4.0 or Hybrid Access Broadband Network Architecture such as Broadband Forum (BBF) specification TR-348, July 2016 or Nicolai Leymann and Cornelius Heidemann and Margaret Wasserman and Li Xue and Mingui Zhang, "Hybrid Access Network Architecture", draft-lhwxz-hybrid-access-network-architecture-02, January 2015, promise to provide a remedy and use such protocols between UE/RG and access operator network. Furthermore, these architectures give the operator of such architectures a comprehensive traffic management capability.

FIG. 1 illustrates an exemplary ATSSS architecture as defined by the 3GPP TS 23.501. In FIG. 1, the ATSSS manages simultaneous connectivity for UEs over cellular (3GPP access) and non-cellular access (untrusted non-3GPP access e.g. Wi-Fi). As shown in FIG. 1, the UE connects to a Data Network (DN) over cellular (3GPP access) and Wi-Fi (untrusted non-3GPP access) using the N3 interface towards the ATSSS-UPF (User Plane Function) part of a 5G Core.

In FIG. 1, the untrusted non-3GPP access path is interconnected with the 5G Core through the Non-3GPP Interworking (N3IWF) entity/function, which is responsible to attach the non-3GPP access to the 5G core. The UPF can be understood as the interface between UE and Data Network (e.g. Internet) taking responsibility for traffic management. Other entities/functions forming part of the 5G Core as shown in FIG. 1 are: Authentication Server Function (AUSF), Unified Data Management (UDM), Access and Mobility Management Function (AMF), Session Management Function (SMF), Policy Control Function (PCF) and Application Function (AF) including the control plane and user plane. Further, FIG. 1 also shows the name of the interfaces that are exposed by each of these entities.

The BBF and the Internet Engineering Task Force (IETF) specifies the residential use case, known as Hybrid Access. Currently BBF re-defines Hybrid Access to work with ATSSS also. Hybrid Access combines therefore fixed access (xDSL or fiber) and cellular access within a Residential Gateway (RG).

However, those architectures require integration into the access provider network that provides at least one of the accesses of the simultaneous used accesses. In case of ATSSS, the integration happens in the cellular provider network, whereas for the hybrid access, it might be either the cellular or the fixed access network provider.

Usually an operator of at least one of the multi-connectivity architectures (e.g. in ATSSS or Hybrid Access) owns one or all accesses for multi-connectivity purposes.

Currently, there are no existing approaches that allow multi-connectivity network architectures to provide access to a home network without being physically attached to it.

SUMMARY

In an exemplary embodiment, the present invention provides a system. The system includes: a user equipment (UE); at least two Internet access providers; a multi-connectivity provider backend; a home network (HN); and a data network (DN). The UE comprises at least two access interfaces. Multi-connectivity is provided between the UE and the HN. The multi-connectivity provider backend is configured to establish a connection to the HN, and to provide the UE with access to the HN.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
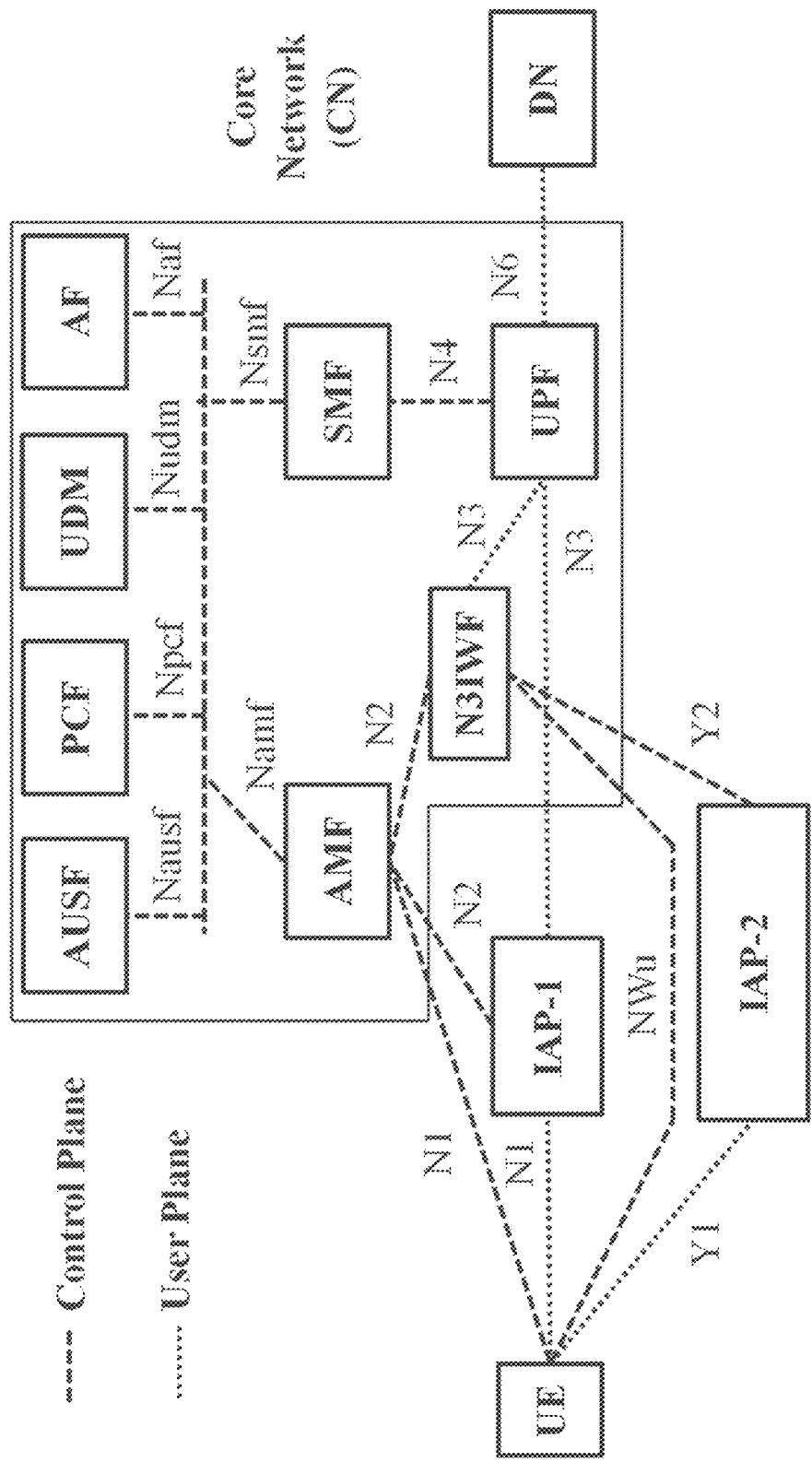
FIG. 1 illustrates an exemplary ATSSS architecture as defined by the 3GPP TS 23.501.

Exemplary embodiments of the present invention provide an access to a home network within a multi-connectivity framework.

According to a first aspect, the invention provides a system comprising a User Equipment (UE), at least two Internet access providers (IAP-1, IAP-2), a multi-connectivity provider backend, a Home Network (HN), and a Data Network (DN), wherein the UE comprises at least two access interfaces, wherein the system is configured to provide multi-connectivity between the UE and the HN, wherein the multi-connectivity provider backend is configured to establish a connection to the HN, and to provide access from the UE to the HN.

According to a further aspect, the establishment of the connection to the HN is done through a tunnel connection from the multi-connectivity provider backend through the DN.

According to a further aspect, the establishment of the connection to the HN is done through routing from the multi-connectivity provider backend through the DN.

According to a further aspect, the DN is the Internet.

According to a further aspect, the multi-connectivity provider backend and the HN belong to a same operator and the multi-connectivity provider backend provides access to the HN without going through the DN.

According to a further aspect, the multi-connectivity provider backend is further configured to: determine whether the UE is already connected to the HN through one of its access interfaces, and if it is determined that one access interface is already connected to the HN: stop the connection from the multi-connectivity provider backend to the HN; or route the HN related traffic to the UE through the already connected access interface.

According to a further aspect, the determination of whether at least one of the UE's access interfaces is already connected to the HN is based on: geo-location, Service Set Identifier (SSID), or signaling between UE and multi-connectivity provided backend.

According to a further aspect, the tunnel connection is encrypted.

According to a further aspect, the multi-connectivity provider backend is further configured to check whether the at least two access interfaces have conflicting IP addresses or overlapping IP addresses with the HN, and if the at least two access interfaces have conflicting IP addresses or overlapping IP addresses with the HN, the multi-connectivity provider backend is configured to apply counter-measures, or the multi-connectivity provider is configured to send a message to the UE, the message comprising an indication to the UE to apply counter-measures.

According to a further aspect, the multi-connectivity provider backend is configured to establish the connection with the HN through a Residential Gateway (RG).

According to a second aspect, the invention provides a method for providing multi-connectivity between a User Equipment (UE) and a Home Network (HN) in a system, the system comprising the UE, at least two Internet access providers (IAP-1, IAP-2), a multi-connectivity provider backend, the Home Network (HN), and a Data Network (DN), wherein the UE comprises at least two access interfaces, the method comprising: establishing, by the multi-connectivity provider backend, a connection to the HN; and providing, by the multi-connectivity provider backend, access from the UE to the HN.

According to a further aspect, wherein the establishing of the connection to the HN is done through a tunnel connection from the multi-connectivity provider backend through the DN.

According to a further aspect, the establishing of the connection to the HN is done through routing from the multi-connectivity provider backend through the DN.

According to a further aspect, the DN is the Internet.

According to a further aspect, the multi-connectivity provider backend and the HN belong to a same operator and the multi-connectivity provider backend provides access to the HN without going through the DN.

According to a further aspect, the method further comprises: determining, by the multi-connectivity provider backend, whether the UE is already connected to the HN through one access interface, and if it is determined that one access interface is already connected to the HN: stopping the connection from the multi-connectivity provider backend to the HN, or routing the HN related traffic to the UE through the already connected access interface.

According to a further aspect, the determination of whether at least one of the UE's access interfaces is already connected to the HN is based on: geo-location, Service Set Identifier (SSID), or signaling between UE and multi-connectivity provided backend.

According to a further aspect, the tunnel connection is encrypted.

According to a further aspect, the method further comprises establishing, by the multi-connectivity provider backend, the connection with the HN through a Residential Gateway (RG).

According to a further aspect, the method further comprises: checking, at the multi-connectivity provider backend, whether the at least two access interfaces have conflicting IP addresses or overlapping IP addresses with the HN, and if the at least two access interfaces have conflicting IP addresses or overlapping IP addresses with the HN, applying counter-measures at the multi-connectivity provider backend, or sending a message to the UE, the message comprising an indication to the UE to apply counter-measures.

The invention has the following advantageous technical effects: enabling the possibility to keep a constant connection to a home network under consideration of multi-connectivity specific features. This allows customer to interact with home devices whenever at least one access is given even if this is not the direct physical access to the home network itself.

Other aspects, features, and advantages will be apparent from the summary above, as well as from the description that follows, including the figures and the claims.

According to an embodiment of the invention, there is provided a system comprising an access to a home network within a multi-connectivity framework without being physically attached to it.

The following description and figures assume a User Equipment (UE) such as, for example, a smartphone, or Residential Gateway (RG), is equipped with Wi-Fi and cellular access interfaces or fixed such as DSL and cellular access interfaces. However, this can be transferred to any other multi-connectivity scenario with more or other accesses.

Figure 2:
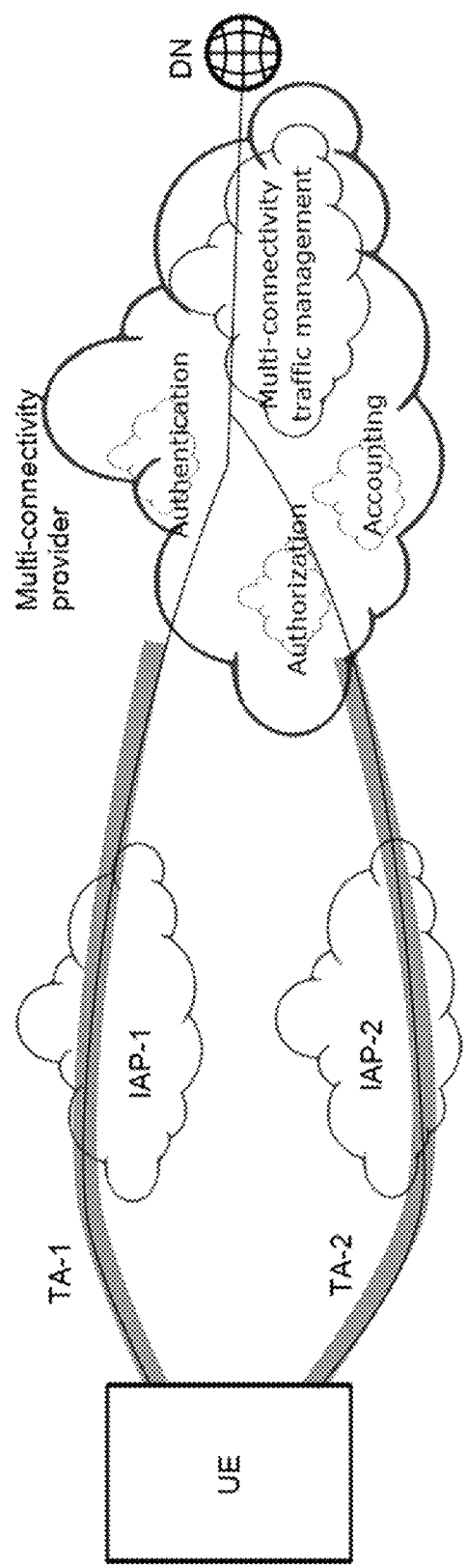
FIG. 2 illustrates a basic architecture for an over-the-top (OTT) multi-connectivity provider according to an embodiment of the present invention.

FIG. 2 illustrates an exemplary architecture for an OTT multi-connectivity provider according to an embodiment of the invention. The principle of this architecture utilizes a multi-connectivity UE or RG which is able to connect to more than one access network and a multi-connectivity provider acting over the top of the access provider networks.

The multi-connectivity provider may be connected to a Data Network (DN), e.g. the Internet.

The UE is configured to connect to the multi-connectivity provider across the access networks. The UE may do so with the help of tunnel accesses for each respective multipath, e.g. virtual private network (VPN) connections or via routing principles. In FIG. 2, there is illustrated a first tunnel access (TA-1), that connects the UE to the multi-connectivity provider via a first internet access provider (IAP-1), and a N tunnel access (TA-N), that connects the UE to the multi-connectivity provider via a N internet access provider (IAP-N). The number N of tunnel accesses and internet access providers is a positive integer equal to or larger than two. However, under operation, this number may fall below two, e.g. if an access is broken, and may need to be restored.

The multi-connectivity provider requires, at least, the functions of authentication and multi-connectivity traffic management. These functions are located in the multi-connectivity provider's backend, e.g. located in the operator network or in a public data center.

The multi-connectivity provider may authenticate the tunnel to ensure that only eligible UEs can establish the tunnel and exchange in the following user plane traffic.

The process of tunnel establishment, authentication and securing may follow any state of the art technologies like Extensible Authentication Protocol (EAP) methods. EAP is an authentication framework for providing common functions and negotiation of authentication methods called EAP methods.

Once the tunnel has been authenticated, the traffic management function of the multi-connectivity provider redirects the user plane traffic between the UE and the Data Network (DN). The re-direction of traffic is performed by encapsulating the traffic into the tunnel instead of sending the traffic without encapsulation on the access interfaces.

As an alternative, the encapsulated user plane traffic may be encrypted.

As an alternative, the establishment and authentication of a tunnel and/or the encryption of the encapsulated user plane traffic is performed with an Extensible Authentication Protocol (EAP) method or a Transport Layer Security (TLS) method.

Optionally, the multi-connectivity provider may further comprise the functions of Authorization and Accounting, Policy management or (meta-) data collection. However, these optional functions can be separated by e.g. Network Function Virtualization (NFV) or operated in one entity. This entity or these entities can run on bare metal servers or be executed in virtual environments like Virtual Machines (VM) or in user space isolated environments typically called "Container".

Figure 3:
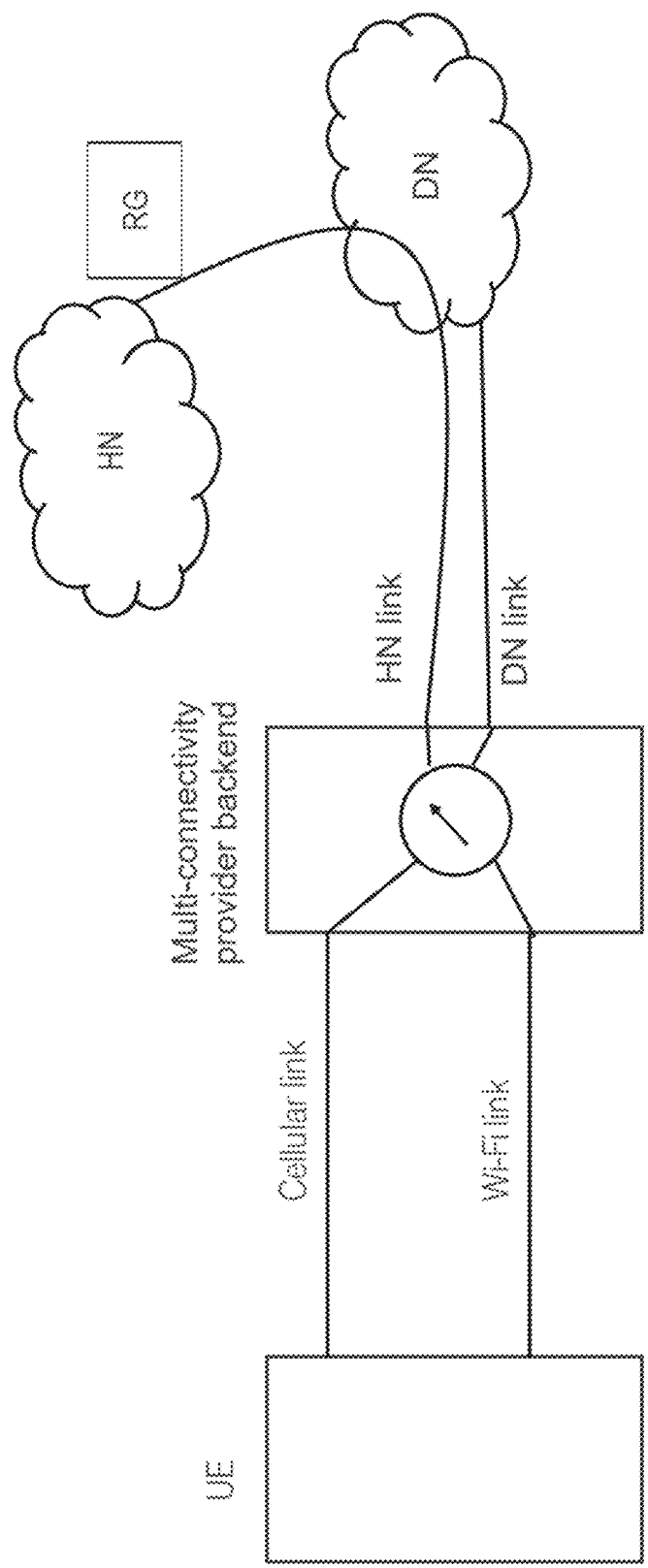
FIG. 3 illustrates a Home Network access provided by a multi-connectivity provider according to an embodiment of the present invention.

FIG. 3 illustrates a Home Network access provided by a multi-connectivity provider according to an embodiment of the present invention.

On behalf of the UE, the multi-connectivity provider backend is configured to establish a connection to a home network.

The multi-connectivity provider backend terminates the multi-connectivity connection, whereas the access operator backend provides connectivity to the RG. If both backends are located in the same environment, a trusted connection is possible without a "(secure) tunnel".

Depending on where the multi-connectivity provider is located, this may be done through a (secure) tunnel connection from the multi-connectivity provider through the Internet to the residential gateway (RG) of the home network (OTT approach). Otherwise it might benefit from a deep integration level. A deep integration level occurs, for example, when the multi-connectivity provider backend and the RG access operator backend where the RG connects to are the same, and make use of other technologies to connect the RG and the UE, e.g. via routing.

In both cases, the UE has direct IP connectivity (OSI Layer 3) to the home network or even Media Access Control (MAC) connectivity (OSI Layer 2).

In order to avoid addressing, routing, and delay conflicts when one UE access interface of the multi-connectivity connection is already connected to the home network, a kind of breakout mechanism is utilized. Such mechanism may be, for example, destructing, at the multi-connectivity provider, the connection from the backend to the home network or routing the home network related traffic in the UE directly through the Wi-Fi interface.

Mechanisms to detect an already established physical connection to the home network may be the geo-location (e.g. a predefined home network location based on geo-coordinates), Service Set Identifier (SSID) or signaling between UE and backend while comparing, for example, public IP addresses.

The multi-connectivity provider backend may be further configured to check whether the at least two access interfaces have conflicting IP addresses or overlapping IP addresses with the Home Network (HN). If the at least two access interfaces have conflicting IP addresses or overlapping IP addresses with the HN, the UE or the multi-connectivity provider backend may apply counter-measures to solve the conflict.

For example, some examples of such counter measures are: in order to avoid IPv4 address conflicts when the Wi-Fi network and the home network have overlapping IP subnets, a possible counter-measure according to an alternative is to use IPv6 addressing only for reaching the home network or inform the user of the UE about this situation and let the user select the preferred network: home network or local Wi-Fi network.

In case the UE is equipped with a Wi-Fi autologin feature it also possible that a user of the UE at home connects to a neighbor Wi-Fi due to better signal conditions. Therefore, a geo-location restriction may be applied only in a limited home area and not globally to avoid this scenario and keep the UE user connected to its home network.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system, comprising:
   a user equipment (UE);
   at least two Internet access providers;
   a multi-connectivity provider backend;
   a home network (HN); and
   a data network (DN);
   wherein the UE comprises at least two access interfaces;
   wherein the multi-connectivity provider backend is configured to establish a connection to the HN and to provide the UE with access to the HN, whereby multi-connectivity is provided between the UE and the HN, wherein the multi-connectivity includes the UE being connected to the HN simultaneously via multiple types of access technologies;
   wherein the multi-connectivity provider backend is further configured to:
      check whether the at least two access interfaces have conflicting IP addresses or overlapping IP addresses with the HN; and
      based on the at least two access interfaces have conflicting IP addresses or overlapping IP addresses with the HN, apply counter-measures in the multi-connectivity provider backend, or
         send a message to the UE, the message comprising an indication to the UE to apply counter-measures.

2. The system of claim 1, wherein the establishment of the connection to the HN includes a tunnel connection from the multi-connectivity provider backend through the DN.

3. The system of claim 2, wherein the tunnel connection is encrypted.

4. The system of claim 1, wherein the establishment of the connection to the HN includes routing from the multi-connectivity provider backend through the DN.

5. The system of claim 1, wherein the DN is the Internet.

6. The system of claim 1, wherein the multi-connectivity provider backend and the HN belong to a same operator, and the multi-connectivity provider backend provides access to the HN without going through the DN.

7. The system of claim 1, wherein the multi-connectivity provider backend is further configured to:
   determine whether the UE is already connected to the HN through one of the UE's access interfaces; and
   based on determining that one access interface is already connected to the HN:
      stop the connection from the multi-connectivity provider backend to the HN; or
      route HN-related traffic to the UE through the already connected access interface.

8. The system of claim 7, wherein the determination of whether at least one of the UE's access interface is already connected to the HN is based on: geo-location, a Service Set Identifier (SSID), or signaling between the UE and the multi-connectivity provided backend.

9. The system of claim 1, wherein the multi-connectivity provider backend is configured to establish the connection with the HN through a residential gateway (RG).

10. The system of claim 1, wherein the multiple types of access technologies include Wi-Fi and cellular access technologies.

11. A method for providing multi-connectivity between a user equipment (UE) and a home network (HN) in a system, the system comprising the UE, at least two Internet access providers, a multi-connectivity provider backend, the HN, and a data network (DN), wherein the UE comprises at least two access interfaces, the method comprising:
   establishing, by the multi-connectivity provider backend, a connection to the HN; and
   providing, by the multi-connectivity provider backend, the UE with access to the HN, whereby multi-connectivity is provided between the UE and the HN, wherein the multi-connectivity includes the UE being connected to the HN simultaneously via multiple types of access technologies;
   wherein the method further comprises:
   checking, at the multi-connectivity provider backend, whether the at least two access interfaces have conflicting IP addresses or overlapping IP addresses with the HN; and
   based on the at least two access interfaces have conflicting IP addresses or overlapping IP addresses with the HN,
      applying counter-measures in the multi-connectivity provider backend, or
      sending a message to the UE, the message comprising an indication to the UE to apply counter-measures.

12. The method of claim 11, wherein the establishing of the connection to the HN includes a tunnel connection from the multi-connectivity provider backend through the DN.

13. The method of claim 12, wherein the tunnel connection is encrypted.

14. The method of claim 11, wherein the establishing of the connection to the HN includes routing from the multi-connectivity provider backend through the DN.

15. The method of claim 11, wherein the DN is the Internet.

16. The method of claim 11, wherein the multi-connectivity provider backend and the HN belong to a same operator, and the multi-connectivity provider backend provides access to the HN without going through the DN.

17. The method of claim 11, further comprising:
   determining, by the multi-connectivity provider backend, whether the UE is already connected to the HN through one access interface, and
   based on determining that one access interface is already connected to the HN:
      stopping the connection from the multi-connectivity provider backend to the HN, or
      routing HN-related traffic to the UE through the already connected access interface.

18. The method of claim 17, wherein the determination of whether the UE is already connected to the HN through one access interface is based on: geo-location, a Service Set Identifier (SSID), or signaling between the UE and the multi-connectivity provided backend.

19. The method of claim 11, further comprising:
    establishing, by the multi-connectivity provider backend, the connection with the HN through a residential gateway (RG).

\* \* \* \* \*